United States Patent
Yen et al.

(10) Patent No.: US 7,259,124 B2
(45) Date of Patent: Aug. 21, 2007

(54) HYDROGEN STORAGE COMPOSITE AND PREPARATION THEREOF

(75) Inventors: Pei-Shan Yen, Hsinchu (TW); Ching-Sung Hsiao, Hsinchu (TW); Kong-Wei Cheng, Hsinchu (TW); Jau-Chyn Huang, Hsinchu (TW)

(73) Assignee: Industrial Technology Research Institiute, Chutung, Hsinchu (TW)

( * ) Notice: Subject to any disclaimer, the term of this patent is extended or adjusted under 35 U.S.C. 154(b) by 48 days.

(21) Appl. No.: 11/050,847

(22) Filed: Feb. 7, 2005

(65) Prior Publication Data

US 2006/0178266 A1   Aug. 10, 2006

(51) Int. Cl.
*B01J 21/18*   (2006.01)
*B01J 23/02*   (2006.01)
*B01D 53/22*   (2006.01)
*C22C 38/00*   (2006.01)
*C22C 23/02*   (2006.01)

(52) U.S. Cl. .......... 502/185; 502/183; 502/184; 502/524; 423/248.1; 423/648; 420/8; 420/402; 420/410; 420/416; 420/417; 420/900

(58) Field of Classification Search ........ 502/183–185, 502/526, 524, 124; 420/8, 402, 41, 417, 420/900, 416, 410; 423/248.1, 648
See application file for complete search history.

(56) References Cited

U.S. PATENT DOCUMENTS

| | | | | |
|---|---|---|---|---|
| 3,492,197 A | * | 1/1970 | Bonorden et al. | 428/412 |
| 3,573,122 A | * | 3/1971 | Olstowski et al. | 264/29.1 |
| 3,574,644 A | * | 4/1971 | Olstowski et al. | 523/200 |
| 4,749,514 A | * | 6/1988 | Murakami et al. | 252/500 |
| 5,273,778 A | * | 12/1993 | Yoshimoto et al. | 427/122 |
| 6,413,670 B1 | * | 7/2002 | Ovshinsky et al. | 429/218.2 |
| 6,927,250 B2 | * | 8/2005 | Kaschak et al. | 524/495 |
| 2002/0136881 A1 | * | 9/2002 | Yanagisawa et al. | 428/293.1 |
| 2003/0116753 A1 | * | 6/2003 | Norley et al. | 252/500 |
| 2004/0121122 A1 | * | 6/2004 | Reynolds et al. | 428/137 |
| 2004/0191589 A1 | * | 9/2004 | Katamura et al. | 429/19 |
| 2005/0129566 A1 | * | 6/2005 | Fetcenko et al. | 420/441 |
| 2005/0148466 A1 | * | 7/2005 | Lemmon et al. | 502/416 |
| 2005/0173244 A1 | * | 8/2005 | Hayashi et al. | 204/282 |
| 2005/0268779 A1 | * | 12/2005 | Fan et al. | 95/57 |
| 2006/0019162 A1 | * | 1/2006 | Shirahige et al. | 429/218.2 |

FOREIGN PATENT DOCUMENTS

JP   10-072201   *   3/1998

* cited by examiner

*Primary Examiner*—Jerry Lorengo
*Assistant Examiner*—Patricia L. Hailey
(74) *Attorney, Agent, or Firm*—Bacon & Thomas, PLLC

(57) ABSTRACT

The present invention discloses a hydrogen storage medium including a composite of an alloy and a catalyst/expandable graphite. The expandable graphite can be replaced by activated carbon. The catalyst content is 1-50% based on the weight of the medium, which can be Pd, Pt, Cu, Co or Ni. The alloy can be a Mg-based alloy, Ti-based alloy, La-based alloy, Mn-based alloy or Fe-based alloy. The present invention also discloses a process for preparing a hydrogen storage composite.

18 Claims, 3 Drawing Sheets

HYDROGEN STORAGE COMPOSITE AND PREPARATION THEREOF

FIELD OF THE INVENTION

The present invention relates to a low temperature hydrogen storage medium, particularly a low temperature hydrogen storage medium containing a composite of an alloy and a catalyst/expandable graphite.

BACKGROUND OF THE INVENTION

The research on substitute energy to fossil fuel has gaining more importance by the day. Hydrogen is a substitute energy which is recyclable, safe and clean. From the considerations of safety, convenience, and energy density, hydrogen storage is preferably carried out by adsorption of hydrogen on a metal to form a non-explosive metal hydride solid. The Department of Energy (DOE) of the U.S.A. has published a plan that researches on the storage of hydrogen in the future are concentrated on low temperature hydrogen storage alloys and hydrogen storage carbonaceous material. To be used as a power source for an automobile using a fuel cell, the energy density of hydrogen storage for a hydrogen storage system needs to be 6.5 wt % or 60 kg/m$^3$ and a travel range for the hydrogen storage system is of 350 miles.

A hydrogen storage alloy is formed of an element having a strong affinity with hydrogen, and capable of existing in a compound state after being combined with the hydrogen molecule. The existing hydrogen storage alloys mainly include: rare earth series, titanium series, zirconium series, and magnesium series; or can be classified into the following types according to the atomic ratio of the major constituting elements: AB, $A_2B$, $AB_2$, $AB_5$, $A_xB$, $AB_x$, wherein A is a hydrogen binding element, B is an element with catalytic function, regulation function, or special function.

To achieve a hydrogen storage target of 6 wt %, only the magnesium series alloys are available at the present, for example those disclosed in U.S. Pat. No. 6,193,929 (which is incorporated herein by reference). However, such an alloy is not practical due to the restriction that the alloy releases hydrogen at a temperature exceeding 300° C. So far, low temperature hydrogen storage alloys developed can only store about 2 wt % of hydrogen, and most of them are titanium series or lanthanum-nickel series alloys.

SUMMARY OF THE INVENTION

In consideration of the hydrogen storage alloys currently available being having a larger hydrogen storage capacity only at a high temperature, one major objective of the present invention is to provide a hydrogen storage medium having a larger hydrogen storage capacity at a medium or low temperature.

A hydrogen storage medium according to the present invention has the following advantages: capable of storing hydrogen above 30° C., having a wide application range and a rapid hydrogen storage rate.

Another objective of the present invention is to provide a method for preparing a hydrogen storage medium having a larger hydrogen storage capacity at a medium or low temperature.

In order to accomplish the objectives a hydrogen storage composite material prepared according to the present invention comprises an alloy and a catalyst/carrier, wherein said catalyst/carrier comprises a carrier and a catalyst deposited on the carrier, wherein said carrier is expandable graphite or activated carbon.

Preferably, said catalyst comprises Pd, Pt, Cu, Co, or Ni, wherein the content of said catalyst is 1-50% based on the total weight of said catalyst/carrier.

Preferably, the content of said alloy is 50-95% based on the total weight of said hydrogen storage composite material.

Preferably, said carrier is an expandable graphite. A suitable process for preparing said expandable graphite comprises grinding a mixture of a layered graphite and an organic solvent, and drying the resulting ground mixture. Preferably, said organic solvent is tetrahydrofuran. Preferably, the content of said catalyst/expandable graphite is 5-50% based on the total weight of said composite material.

Preferably, said alloy is selected from the group consisting of magnesium series alloy, titanium series alloy, lanthanum series alloy, manganese series alloy, and iron series alloy.

BRIEF DESCRIPTION OF THE DRAWINGS

FIG. 3b is an energy dispersive spectroscopy (EDS) photo of the Pd/expandable graphite in FIG. 3a.

DETAILED DESCRIPTION OF THE INVENTION

Figure 1:
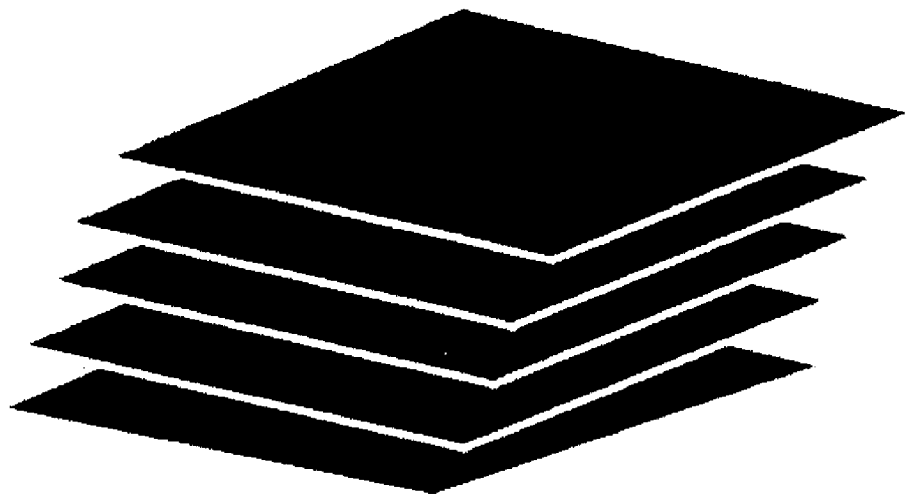
FIG. 1 shows a schematic diagram of the layered structure of a natural graphite.
Figure 2:
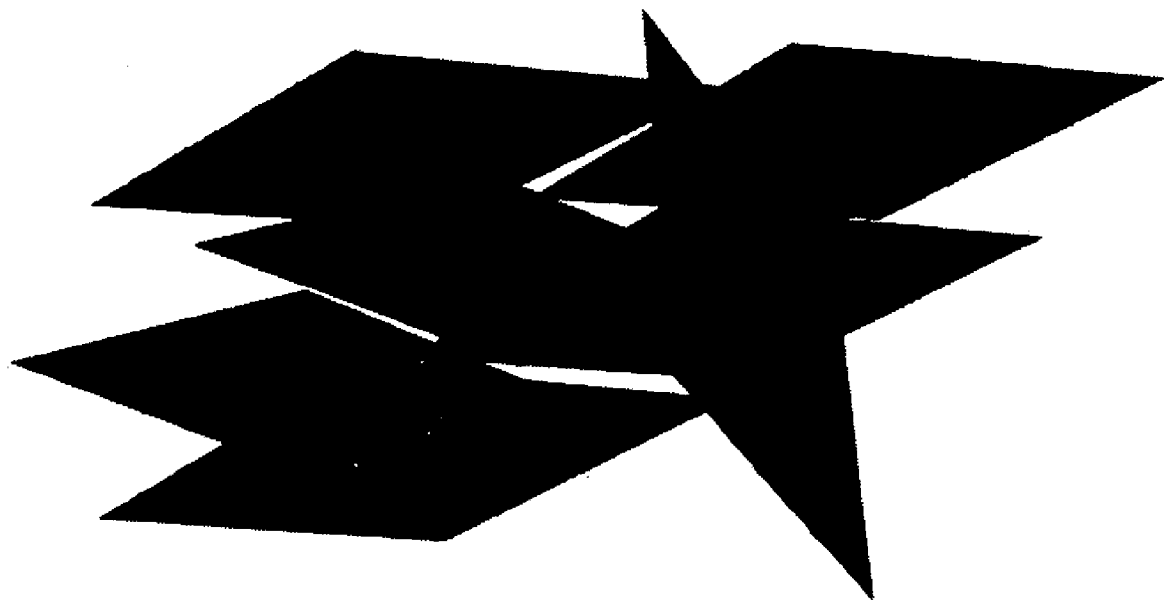
FIG. 2 shows a schematic diagram of an expandable graphite according to the present invention.

In a preferred embodiment of the present invention, a commercially available natural graphite was added into a specified amount of THF (tetrahydrofuran) solvent. The resulting mixture was ground by using a high energy ball mill method at room temperature for a few hours, and then dried and broken to obtain an expandable graphite. At this stage, the original graphite layered structure (as shown in FIG. 1) had been broken to a flake structure (as shown in FIG. 2) in order to increase the surface area thereof. Next, known methods, e.g. chemical method, mechanical fusion method, and ball mill method, can be used to deposit the catalyst particles to an expandable graphite carrier to form a catalyst/expandable graphite, wherein the catalyst particles of the composite material need to be fine and uniformly dispersed on graphite flakes.

Figure 3A:
FIGS. 3a and 3c are scanning electron microscopy (SEM) photos of the Pd/expandable graphite from an embodiment according to the present invention.
Figure 3B:
Figure 3C:
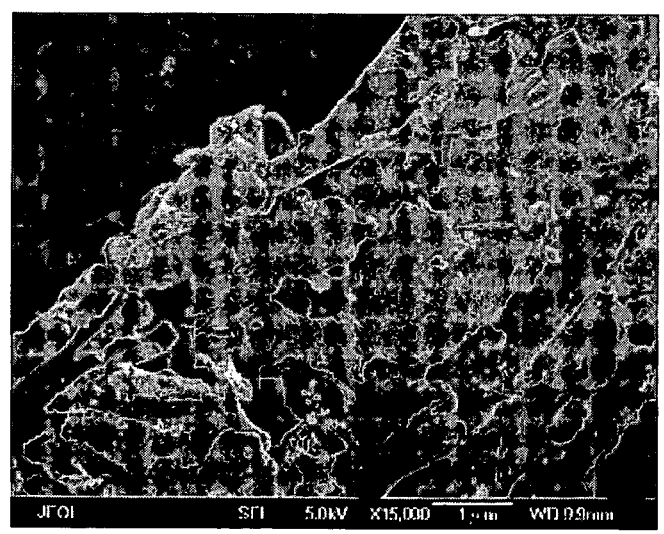

For example, a chemical method in preparing a Pd/expandable graphite comprises: dissolving a catalyst precursor $PdCl_2$ into an acid solution; dispersing an expandable graphite into water to form a suspension; mixing the $PdCl_2$ solution with the graphite suspension for a few minutes; adding sodium hydroxide to the resulting mixture followed by adding a reducing agent (formaldehyde) to precipitate Pd in a metal form on the surfaces of graphite; and finally performing filtration and drying steps to obtain a Pd/expandable graphite powder. The SEM and EDS photos thereof are shown in FIGS. 3a, 3b, and 3c, wherein the dots distributed in the EDS photo of FIG. 3b are Pd element deposited on the graphite, and Pd particles are observable in FIGS. 3a and 3c.

For another example, a ball mill method for producing a Pd/expandable graphite comprises: adding a specified amount of Pd powder to a specified amount of an expandable graphite; and grinding the resulting mixture in an inert/nitrogen atmosphere for a few hours, thereby obtaining a Pd/expandable graphite powder, wherein strong bombardments during the grinding process lead to mutual fusion of Pd and graphite.

A catalyst/expandable graphite powder prepared in the above and an alloy is jointly ground at a specified ratio by a mechanical fusion method or a ball mill method to form a hydrogen storage medium of the present invention, wherein the constant bombardment among the alloy and the catalyst/expandable graphite powder during the grinding process will cause alloying and the catalyst/expandable graphite powder being distributed on the surface of a relatively larger alloy particle.

EXAMPLES AND COMPARATIVE EXAMPLES

Taking a titanium series alloy $Ti_{0.8}Zr_{0.3}Mn_{1.4}Mo_{0.05}Cu_{0.05}V_{0.2}Cr_{0.2}$ as an example, the subscript represented a mole number. This alloy was produced by a vacuum electric arc smelting method, wherein the metals were molten in vacuum and under high temperature according to a specified mole ratio.

2 g of a commercially available natural graphite was mixed with 20 ml of THF. A high energy ball mill method was used to grind the resulting mixture at room temperature for 9 hours. Next, the mixture was removed from the ball mill, dried at 140° C. for 4 hours, and broken to obtain an expandable graphite powder.

5.4 g of the produced expandable graphite powder was dispersed in 150 ml of water to form a suspension. 1 g of $PdCl_2$ was dissolved in 2.5 ml of HCl and 6.25 ml of $H_2O$. The $PdCl_2$ acidic solution and the graphite suspension were mixed for a few minutes, added with 6.25 ml of sodium hydroxide, and 8 ml of formaldehyde to form a precipitation of Pd metal, so that Pd metal was deposited on the surface of graphite. The solid was collected by filtration, and was subjected to water-washing and vacuum drying in sequence several times. The resulting solid was dried at 100° C. in an Ar atmosphere for 4 hours to obtain Pd/expandable graphite.

An alloy/Pd/expandable graphite may be prepared by a ball mill method or a mechanical fusion method. The mechanical fusion method was used in this example including loading 1.8 g of $Ti_{0.8}Zr_{0.3}Mn_{1.4}Mo_{0.05}Cu_{0.05}V_{0.2}Cr_{0.2}$ alloy and 0.2 g of the Pd/expandable graphite prepared in the above in a mechanical fusion device to perform fusion for 6 hours similar to the ball mill method.

Figure 4:
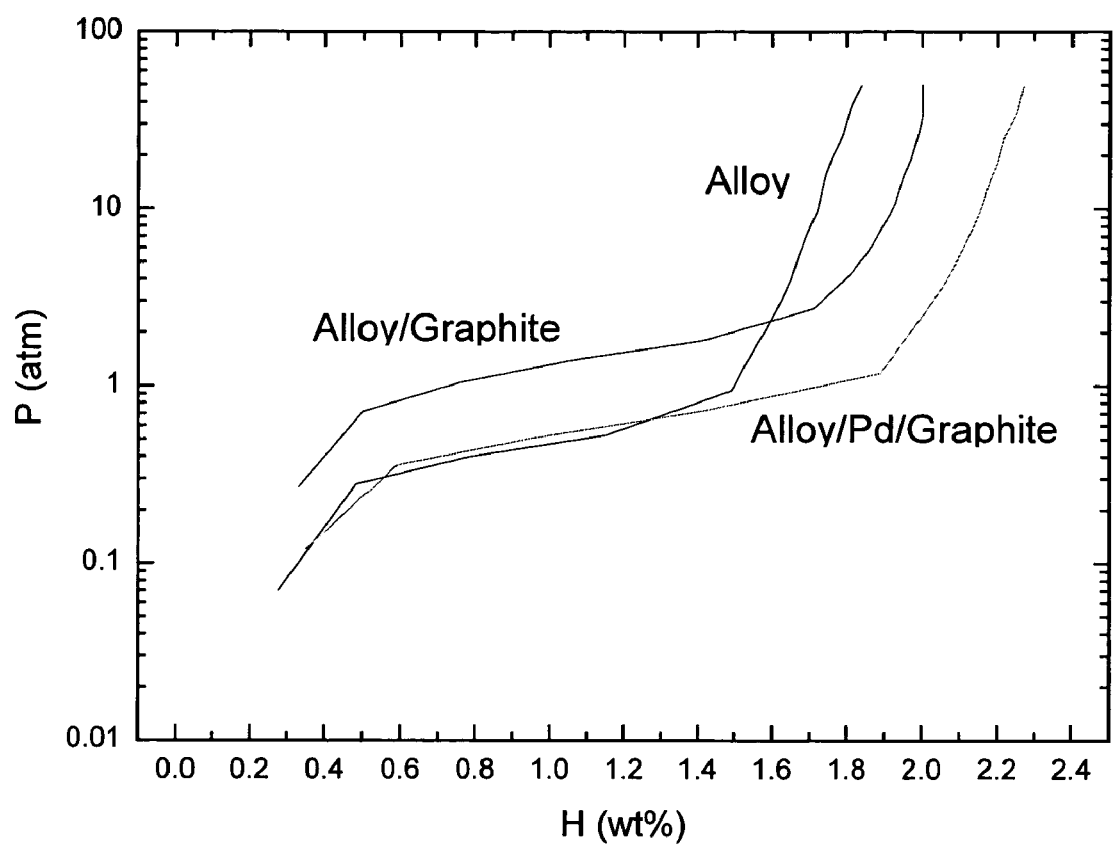
FIG. 4 shows the PCT (pressure-composition-temperature) hydrogen storage capacity at room temperature for three hydrogen storage media of metal alloy, alloy/expandable graphite, and alloy/Pd/expandable graphite, wherein the abscissa represented the hydrogen content % of the hydrogen storage medium, based on the weight of the hydrogen storage medium, and the ordinate represented pressure (atm).

A PCT (pressure-composition-temperature) hydrogen storage test was carried out on the prepared expandable graphite, alloy/expandable graphite, and alloy/Pd/expandable graphite at room temperature. The results are shown in FIG. 4. It can be seen from FIG. 4 that the addition of Pd/expandable graphite indeed increases the hydrogen storage capacity of the alloy.

The invention claimed is:

1. A hydrogen storage composite material, which consists of an alloy and a catalyst/carrier, wherein said catalyst/carrier consists of a carrier and a catalyst deposited on the carrier, wherein said carrier is expandable graphite.

2. The composite material as claimed in claim 1, wherein said catalyst comprises Pd, Pt, Cu, Co, or Ni, wherein the content of said catalyst is 1-50% based on the total weight of said catalyst/carrier.

3. The composite material as claimed in claim 1, wherein the content of said alloy is 50-95% based on the total weight of said hydrogen storage composite material.

4. The composite material as claimed in claim 1, wherein said expandable graphite is prepared by grinding a mixture of a layered graphite and an organic solvent, and drying the resulting ground mixture.

5. The composite material as claimed in claim 4, wherein said organic solvent is tetrahydrofuran.

6. The composite material as claimed in claim 1, wherein the content of said catalyst/expandable graphite is 5-50% based on the total weight of said composite material.

7. The composite material as claimed in claim 1, wherein said alloy is selected from the group consisting of magnesium series alloy, titanium series alloy, lanthanum series alloy, manganese series alloy, and iron series alloy.

8. The composite material as claimed in claim 2, wherein said alloy is selected from the group consisting of magnesium series alloy, titanium series alloy, lanthanum series alloy, manganese series alloy, and iron series alloy.

9. A hydrogen storage composite material, which consists of an alloy and a catalyst/carrier, wherein said catalyst/carrier consists of a carrier and a catalyst deposited on the carrier, wherein said carrier is expandable graphite,
wherein said expandable graphite is prepared by grinding a mixture of a layered graphite and an organic solvent, and drying the resulting ground mixture.

10. The composite material as claimed in claim 9, wherein said catalyst comprises Pd, Pt, Cu, Co, or Ni, wherein the content of said catalyst is 1-50% based on the total weight of said catalyst/carrier.

11. The composite material as claimed in claim 9, wherein the content of said alloy is 50-95% based on the total weight of said hydrogen storage composite material.

12. The composite material as claimed in claim 9, wherein said organic solvent is tetrahydrofuran.

13. The composite material as claimed in claim 9, wherein the content of said catalyst/expandable graphite is 5-50% based on the total weight of said composite material.

14. The composite material as claimed in claim 9, wherein said alloy is selected from the group consisting of magnesium series alloy, titanium series alloy, lanthanum series alloy, manganese series alloy, and iron series alloy.

15. The composite material as claimed in claim 9, wherein said alloy is selected from the group consisting of magnesium series alloy, titanium series alloy, lanthanum series alloy, manganese series alloy, and iron series alloy.

16. A hydrogen storage composite material, which comprises an alloy, a catalyst/carrier, and at least 1% of hydrogen gas adsorbed on the composite material at a pressure of 1 atm, based on the weight of the composite material, wherein said catalyst/carrier comprises a carrier and a catalyst deposited on the carrier, wherein said carrier is expandable graphite.

17. The composite material as claimed in claim 16, wherein said expandable graphite is prepared by grinding a mixture of a layered graphite and an organic solvent, and drying the resulting ground mixture.

18. The composite material as claimed in claim 16, wherein said organic solvent is tetrahydrofuran.

* * * * *